Nov. 30, 1954 J. O. SEAMANS 2,695,961
AUTOMATIC FREQUENCY CONTROL CIRCUIT FOR KLYSTRONS
Filed Aug. 7, 1951
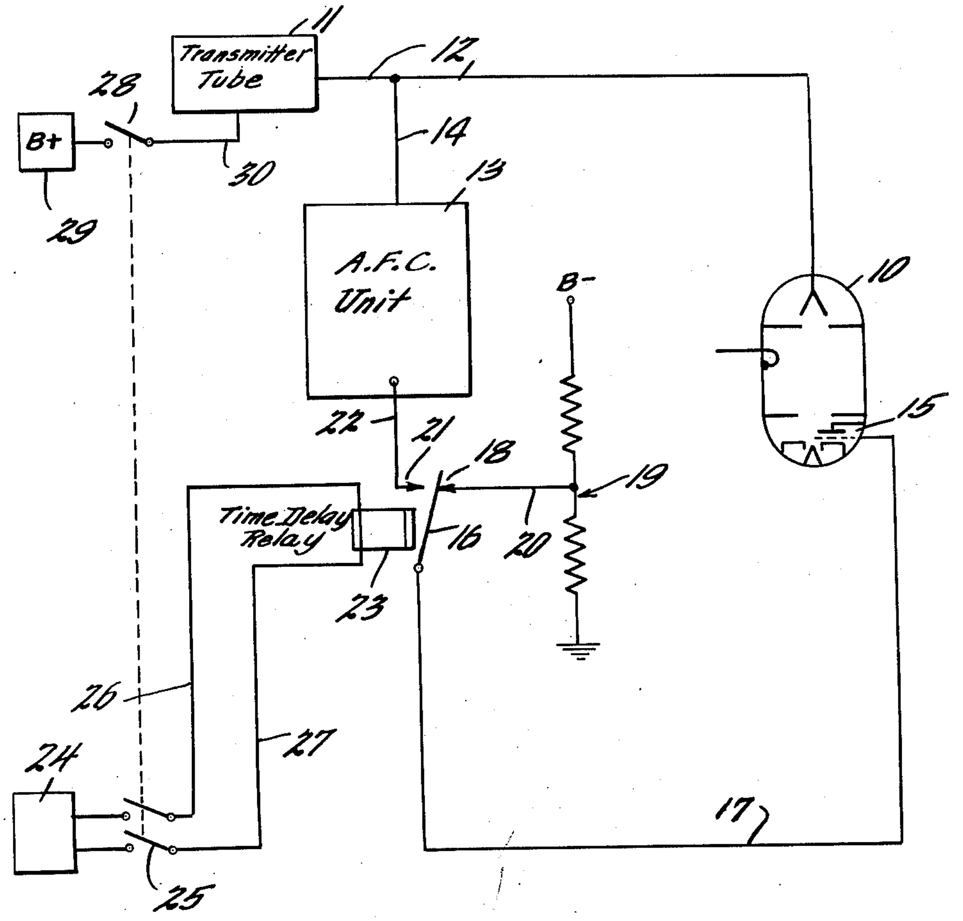
INVENTOR
James O. Seamans,
BY C. B. Hamilton.
ATTORNEY

United States Patent Office 2,695,961

Patented Nov. 30, 1954

2,695,961

AUTOMATIC FREQUENCY CONTROL CIRCUIT FOR KLYSTRONS

James O. Seamans, Winston-Salem, N. C., assignor to Western Electric Company, Incorporated, New York, N. Y., a corporation of New York Application August 7, 1951, Serial No. 240,697

3 Claims. (Cl. 250—36)

This invention relates to a control circuit for a tuned reflex klystron, and more particularly to a circuit for preventing false tracking by an automatic frequency control circuit used with a thermally tuned reflex klystron.

In the past, a predetermined frequency difference between the variable frequency of a tuned oscillator and another source of oscillation such as a transmitting tube was maintained by an automatic frequency control circuit utilizing a double flip-flop circuit to prevent tracking on an improper sideband frequency. However, this double flip-flop circuit requires three to five additional vacuum tubes and associated circuitry which are not necessary in a single flip-flop automatic frequency control circuit using a single heat reversing multivibrator. In order to use such a single flip-flop circuit and obtain the consequent savings in expense and space made available thereby, it is necessary to have a circuit for preventing the single flip-flop system from tracking on an improper sideband frequency.

Accordingly, an object of this invention is to provide a circuit for preventing a single flip-flop automatic frequency control system from tracking on an undesired sideband frequency.

In accordance with this and other objects, one embodiment of the invention comprises a thermally tuned reflex klystron tube having a control grid therein normally connected to a source of biasing voltage which operates the klystron tube at the high frequency end of its frequency range. The outputs of the klystron tube and a transmitting tube such as a magnetron are mixed and a portion of the resulting voltage is applied to a single flip-flop automatic frequency control system. A time delay relay which is energized simultaneously with the firing of the magnetron removes the biasing voltage from the control grid and connects the automatic frequency control system thereto after a predetermined lapse of time sufficient for the magnetron to reach its operating frequency. Since the decrease in the output frequency of the klystron tube due to the removal of the biasing voltage occurs after the magnetron reaches its operating frequency, the automatic frequency control system tracks only on the desired upper sideband frequency.

Other objects and advantages of the invention will be apparent from a consideration of the following specification when taken in conjunction with the drawing wherein the figure is a schematic diagram of a circuit embodying the invention for preventing false tracking in a single flip-flop automatic frequency control system.

Referring now to the drawing, the variable frequency output from a thermally tuned klystron oscillator 10 is connected with the output of another source of frequency, such as a modulator or transmitting tube 11, through a conductor 12. A portion of this combined output is applied to an automatic frequency control (AFC) system 13 through a conductor 14. The frequency control system 13, for example, may be of the single flip-flop type utilizing a heat reversing multivibrator to produce an output voltage proportional to the difference between the desired and actual frequency differential between the operating frequency of the klystron oscillator 10 and the transmitting tube 11.

A control grid 15 of the klystron oscillator 10 is connected to a single pole, double throw switch 16 through a conductor 17. The switch 16 normally engages a contact 18 which is electrically connected to a source of negative biasing voltage 19 through conductor 20. The source of biasing voltage 19 is adjusted to a value which will operate the klystron oscillator 10 at the uppermost end of its operating frequency range. For instance, a negative voltage of 65 volts is necessary to operate a 2K45 klystron tube 10 at its highest frequency.

The switch 16 is actuated to connect grid 15 to the AFC unit 13 through a contact 21 and a conductor 22 by the operation of a time delay relay 23. This time delay relay 23 is energized by a source of voltage 24 through a switch 25 and conductors 26 and 27. Another switch 28, which is closed by the operation of the switch 25, connects a source of B+ voltage 29 to the transmitter tube 11 through a conductor 30. Since the transmitting tube 11, such as a magnetron, is placed in operation by the application of voltage from source 29 simultaneously with the energization of time delay relay 23, this relay does not operate to disconnect the negative biasing voltage source 19 from grid 15 until a period of time has elapsed sufficient for the tube 11 to reach operating frequency. After passage of this predetermined time, the relay 23 operates to connect grid 15 to the AFC unit 13 through contact 21 and conductors 17, 22 so that the operating frequency of oscillator 10 decreases. The operating frequency of the oscillator 10 continues to decrease until such time as the desired upper sideband frequency is reached. Then the AFC unit 13 "locks in" to maintain the frequency of oscillator 10 at the value necessary to produce the desired upper sideband frequency.

In operation, since relay 23 is normally not energized, switch 16 connects grid 15 of oscillator tube 10 to the source of negative voltage 19 through contact 18 and conductor 17. At this time the oscillator 10 is operating at its highest frequency which is above the frequency required to produce the upper sideband frequency. When it is desired to switch the system from this standby condition to an operating condition, switches 25 and 28 are simultaneously closed. The closure of switch 28 applies the operating voltage 29 to the transmitting tube 11 so that this tube fires and starts to reach its normal operating frequency. The closure of switch 25 energizes relay 23 from voltage source 24 through conductors 26, 27 so that after passage of a predetermined period of time sufficient to allow the transmitting tube 11 to reach its operating frequency, the relay 23 is then operated to move switch 16 out of engagement with contact 18 and into engagement with contact 21.

The removal of the biasing voltage of source 19 from the grid 15 allows the frequency of operation of oscillator 10 to decrease until such time as the desired upper sideband frequency is produced by the mixing of the output voltage from oscillator 10 and transmitting tube 11. At this time, the AFC unit 13 "locks in" on the sideband frequency and produces a control voltage sufficient to maintain the operating frequency of the oscillator 10 at the required value necessary to produce a desired upper sideband. The control voltages from the AFC unit 13 are applied to grid 15 through a circuit comprising conductor 22, contact 21, switch 16, and conductor 17.

The circuit described is merely one embodiment of the invention and numerous other circuits may be devised by those skilled in the art which will embody the principles of this invention and fall within the spirit and scope thereof.

What is claimed is:

1. In combination with an automatic frequency control circuit, a tunable oscillator having a control element, a source of biasing voltage normally connected to the control element, and time delay means operating irrespective of the output of said oscillator for disconnecting the biasing voltage from and connecting the automatic frequency control circuit to the said control element.

2. In combination with an automatic frequency control circuit for a thermally tuned oscillator having a control element, a source for biasing voltage, means for applying a biasing voltage to the control element, and means operating irrespective of the output of said oscillator for disconnecting the biasing voltage from the control element and for connecting the automatic frequency control circuit thereto.

3. In combination with an automatic frequency control circuit, a thermally tuned reflex klystron having a control grid, a source of biasing voltage for operating the klystron at a predetermined frequency, a switch electrically connected to the said control grid and normally connected to the biasing voltage, and a time delay relay operating irrespective of the output of said oscillator for operating the switch to disconnect the biasing voltage from and connect the automatic frequency control circuit to the said grid.

4. In combination with an automatic frequency control circuit, a tunable oscillator having a control element, a source of biasing voltage for operating the oscillator at a predetermined frequency, switch means for initially connecting the biasing potential to the control element and actuable for connecting the frequency control circuit to said control element, and time delay means operating irrespective of the output of said oscillator for actuating the switch means to disconnect the biasing potential and to connect the frequency control circuit to the control element.

5. A system for preventing an automatic frequency control circuit from maintaining an improper frequency differential between a source of frequency and the output of a tunable oscillator having a control element, said system comprising a source of biasing voltage for operating the oscillator at a predetermined frequency above or below the frequency of the said source, switching means for normally connecting the biasing voltage to the control element, time delay means for actuating the switching means to connect the automatic frequency control circuit to the control element, and means for simultaneously energizing the frequency source and the time delay means so that the biasing voltage maintains the oscillator operating frequency above or below the frequency of the source for a predetermined time after the energization of said source.

6. A system for locking an automatic frequency control circuit on the upper sideband frequency produced by a modulator comprising a variable frequency oscillator having a control element, a source of biasing voltage normally connected to the control element for operating the oscillator at a predetermined frequency above that required to produce the desired frequency of the upper sideband, means for disconnecting the biasing voltage from and for connecting the automatic frequency control circuit to the control element, and means for operating the connecting means to connect the control element to the automatic frequecy control circuit a predetermined time after the modulator is energized, whereby the frequency of operation of the oscillator does not decrease until the modulator is in an operative condition to thereby assure that the automatic frequency control circuit locks in on the upper sideband frequency.

7. A system for preventing an automatic frequency control circuit from maintaining an improper frequency differential between two sources of frequency, comprising a first source of variable frequency voltage having a control element, a second source of frequency, automatic frequency control means controlled by the difference in frequency between the first and second frequency sources for producing a voltage proportional thereto, voltage biasing means normally connected to said control element to produce a predetermined frequency output from said first source, time delay means for disconnecting the biasing voltage from and for connecting the automatic frequency control means to the control element, and means for simultaneously energizing the time delay means and the second frequency source so that the frequency of the first source remains at a predetermined value until the second frequency source has reached its operating frequency.

8. A system for preventing an automatic frequency control circuit from maintaining an improper frequency differential between a source of frequency and the output of a tunable oscillator having a control element, said system comprising a source of biasing voltage for initially operating said oscillator at a predetermined frequency, switching means initially connecting said biasing voltage to the control element of said oscillator, time delay means for actuating said switching means to disconnect said biasing voltage and to connect the automatic frequency control circuit to said control element, and means for simultaneously energizing the frequency source and the time delay means.

References Cited in the file of this patent

UNITED STATES PATENTS

| Number | Name | Date |
|---|---|---|
| 2,541,454 | White et al. | Feb. 13, 1951 |
| 2,557,817 | Dutton | June 19, 1951 |
| 2,562,304 | Durand | July 31, 1951 |